US 9,294,353 B2

(12) United States Patent
Sewall et al.

(10) Patent No.: US 9,294,353 B2
(45) Date of Patent: Mar. 22, 2016

(54) CONFIGURING A WIRELESS ROUTER (75) Inventors: Patrick Sewall, Boise, ID (US); David Alan Johnson, Boise, ID (US)

(73) Assignee: CRADLEPOINT, INC., Boise, ID (US)

( * ) Notice: Subject to any disclaimer, the term of this patent is extended or adjusted under 35 U.S.C. 154(b) by 308 days.

(21) Appl. No.: 12/270,419

(22) Filed: Nov. 13, 2008

(65) Prior Publication Data
US 2009/0147700 A1 Jun. 11, 2009

Related U.S. Application Data (63) Continuation-in-part of application No. 10/936,124, filed on Sep. 8, 2004, now Pat. No. 7,764,784.

(60) Provisional application No. 60/987,908, filed on Nov. 14, 2007, provisional application No. 61/019,898, filed on Jan. 9, 2008.

(51) Int. Cl.
G06F 15/177 (2006.01)
H04L 12/24 (2006.01)
H04L 12/701 (2013.01)
H04L 29/06 (2006.01)
H04W 8/26 (2009.01)
H04W 12/06 (2009.01)
H04W 40/00 (2009.01)
H04W 84/12 (2009.01)
H04W 88/08 (2009.01)
H04L 29/08 (2006.01)

(52) U.S. Cl.
CPC ........ H04L 41/0816 (2013.01); H04L 41/0253 (2013.01); H04L 45/00 (2013.01); H04L 63/083 (2013.01); H04W 8/26 (2013.01); H04W 12/06 (2013.01); H04W 40/00 (2013.01); H04L 67/34 (2013.01); H04W 84/12 (2013.01); H04W 88/08 (2013.01)

(58) Field of Classification Search
CPC .............. H04L 29/06; H04L 29/08072; H04L 29/08981; H04L 41/0806; H04L 29/12
See application file for complete search history.

(56) References Cited

U.S. PATENT DOCUMENTS

| 5,231,633 A | 7/1993 | Hluchyj et al. |
| 5,594,946 A | 1/1997 | Menich et al. |
| 5,638,359 A | 6/1997 | Peltola et al. |
| 5,859,628 A | 1/1999 | Ross et al. |
| 5,864,539 A | 1/1999 | Yin |

(Continued)

FOREIGN PATENT DOCUMENTS

| EP | 1331784 A1 | 7/2003 |
| JP | 20010186565 | 7/2001 |
| KR | 20040028099 | 4/2004 |

OTHER PUBLICATIONS

USPTO, "Office Action in U.S. Appl. No. 11/673,973", Jun. 24, 2010.

(Continued)

Primary Examiner — Philip Chea
Assistant Examiner — Van Kim T Nguyen
(74) Attorney, Agent, or Firm — Parsons Behle & Latimer (57) ABSTRACT

A method for configuring a wireless router includes electronically reading information that is unique to the wireless router. A code is automatically generated from the information. The generated code is automatically set as one or more of a network name and a device password for the wireless router.

25 Claims, 6 Drawing Sheets

(56) References Cited

U.S. PATENT DOCUMENTS

| | | | |
|---|---|---|---|
| 6,006,034 | A | 12/1999 | Heath et al. |
| 6,006,264 | A | 12/1999 | Colby et al. |
| 6,028,848 | A | 2/2000 | Bhatia et al. |
| 6,031,844 | A | 2/2000 | Lin |
| 6,377,825 | B1 | 4/2002 | Kennedy et al. |
| 6,389,462 | B1 | 5/2002 | Cohen et al. |
| 6,434,187 | B1 | 8/2002 | Beard et al. |
| 6,535,592 | B1 | 3/2003 | Snelgrove |
| 6,553,028 | B1 | 4/2003 | Tang |
| 6,560,442 | B1 | 5/2003 | Yost et al. |
| 6,609,197 | B1 * | 8/2003 | Ketcham et al. ............... 713/155 |
| 6,611,861 | B1 | 8/2003 | Schairer et al. |
| 6,615,262 | B2 | 9/2003 | Schweitzer et al. |
| 6,621,798 | B1 | 9/2003 | Krishnan et al. |
| 6,735,447 | B1 | 5/2004 | Muller |
| 6,795,700 | B2 | 9/2004 | Karaoguz et al. |
| 6,850,495 | B1 | 2/2005 | Baum et al. |
| 6,862,444 | B2 | 3/2005 | Karaoguz et al. |
| 6,885,859 | B2 | 4/2005 | Karaoguz et al. |
| 6,967,958 | B2 | 11/2005 | Ono et al. |
| 6,987,726 | B1 * | 1/2006 | Elliott ........................... 370/217 |
| 7,009,941 | B1 * | 3/2006 | Uchino ......................... 370/254 |
| 7,095,335 | B2 * | 8/2006 | De Bolster et al. ......... 340/12.22 |
| 7,187,923 | B2 | 3/2007 | Mousseau et al. |
| 7,213,478 | B2 * | 5/2007 | Harada et al. ................. 73/865.9 |
| 7,317,896 | B1 | 1/2008 | Saxena et al. |
| 7,346,344 | B2 * | 3/2008 | Fontaine ...................... 455/418 |
| 7,382,771 | B2 | 6/2008 | Leblanc et al. |
| 7,400,903 | B2 | 7/2008 | Shoemake et al. |
| 7,421,265 | B1 | 9/2008 | Liu |
| 7,558,199 | B1 | 7/2009 | Minei |
| 7,617,317 | B2 | 11/2009 | Jones et al. |
| 7,620,065 | B2 | 11/2009 | Falardeau |
| 7,675,862 | B2 | 3/2010 | Pham et al. |
| 7,764,784 | B2 | 7/2010 | Sewall |
| 7,813,314 | B2 | 10/2010 | Fulknier et al. |
| 8,046,000 | B2 | 10/2011 | Sylvain |
| 8,077,681 | B2 | 12/2011 | Ahmavaara |
| 8,090,807 | B2 | 1/2012 | Chung et al. |
| 8,126,145 | B1 | 2/2012 | Tewari et al. |
| 2001/0039580 | A1 | 11/2001 | Walker et al. |
| 2001/0042215 | A1 | 11/2001 | Sullivan et al. |
| 2001/0046870 | A1 | 11/2001 | Stilp et al. |
| 2001/0048683 | A1 | 12/2001 | Allen |
| 2002/0025832 | A1 | 2/2002 | Durian et al. |
| 2002/0062372 | A1 | 5/2002 | Hong et al. |
| 2002/0118663 | A1 | 8/2002 | Dorenbosch et al. |
| 2003/0037165 | A1 | 2/2003 | Shinomiya |
| 2003/0043755 | A1 | 3/2003 | Mitchel |
| 2003/0045295 | A1 | 3/2003 | Stanforth |
| 2003/0046396 | A1 | 3/2003 | Richter et al. |
| 2003/0059005 | A1 | 3/2003 | Meyerson et al. |
| 2003/0126252 | A1 | 7/2003 | Abir |
| 2003/0200308 | A1 | 10/2003 | Tameda et al. |
| 2003/0212800 | A1 | 11/2003 | Jones et al. |
| 2003/0235175 | A1 | 12/2003 | Naghian et al. |
| 2003/0236916 | A1 * | 12/2003 | Adcox et al. .................. 709/245 |
| 2004/0003071 | A1 | 1/2004 | Mathew et al. |
| 2004/0038697 | A1 | 2/2004 | Attar et al. |
| 2004/0049576 | A1 | 3/2004 | Schweitzer et al. |
| 2004/0068502 | A1 | 4/2004 | Vogedes |
| 2004/0110544 | A1 | 6/2004 | Oyagi et al. |
| 2004/0125931 | A1 * | 7/2004 | Archer ...................... 379/201.01 |
| 2004/0133689 | A1 * | 7/2004 | Vasisht ........................ 709/228 |
| 2004/0133793 | A1 | 7/2004 | Ginter et al. |
| 2004/0139170 | A1 | 7/2004 | Shen et al. |
| 2004/0152449 | A1 | 8/2004 | Koshihara |
| 2004/0153676 | A1 | 8/2004 | Krantz et al. |
| 2004/0185876 | A1 | 9/2004 | Groenendaal et al. |
| 2004/0205154 | A1 | 10/2004 | Dalton et al. |
| 2004/0205155 | A1 | 10/2004 | Nobakht et al. |
| 2004/0218544 | A1 | 11/2004 | Lee |
| 2004/0242197 | A1 * | 12/2004 | Fontaine ...................... 455/411 |
| 2004/0250136 | A1 | 12/2004 | Albertine Trappeniers et al. |
| 2004/0264395 | A1 * | 12/2004 | Rao ............................. 370/311 |
| 2005/0008017 | A1 | 1/2005 | Datta et al. |
| 2005/0014525 | A1 | 1/2005 | Tsunehara et al. |
| 2005/0022013 | A1 | 1/2005 | Schwenk |
| 2005/0038905 | A1 | 2/2005 | Banes et al. |
| 2005/0044235 | A1 | 2/2005 | Balahura |
| 2005/0047326 | A1 | 3/2005 | Puon et al. |
| 2005/0086346 | A1 | 4/2005 | Meyer |
| 2005/0101340 | A1 | 5/2005 | Archiable |
| 2005/0108573 | A1 | 5/2005 | Bennett et al. |
| 2005/0141431 | A1 * | 6/2005 | Caveney et al. ............... 370/241 |
| 2005/0166072 | A1 * | 7/2005 | Converse et al. ............. 713/201 |
| 2005/0176420 | A1 * | 8/2005 | Graves et al. ................. 455/424 |
| 2005/0198234 | A1 | 9/2005 | Leib et al. |
| 2005/0198319 | A1 | 9/2005 | Chan et al. |
| 2005/0221850 | A1 | 10/2005 | Kashiwase |
| 2005/0233728 | A1 | 10/2005 | Karaoguz et al. |
| 2005/0245233 | A1 | 11/2005 | Anderson |
| 2005/0246434 | A1 | 11/2005 | Bantz et al. |
| 2005/0259645 | A1 | 11/2005 | Chen et al. |
| 2005/0259654 | A1 | 11/2005 | Faulk, Jr. |
| 2005/0262248 | A1 | 11/2005 | Jennings, III et al. |
| 2005/0267965 | A1 | 12/2005 | Heller |
| 2006/0025141 | A1 | 2/2006 | Marsh et al. |
| 2006/0047823 | A1 | 3/2006 | Cheng |
| 2006/0053290 | A1 | 3/2006 | Randle |
| 2006/0072474 | A1 | 4/2006 | Mitchell |
| 2006/0077607 | A1 | 4/2006 | Hendricks et al. |
| 2006/0133582 | A1 | 6/2006 | McCulloch |
| 2006/0153216 | A1 | 7/2006 | Hosein et al. |
| 2006/0171402 | A1 | 8/2006 | Moore et al. |
| 2006/0184670 | A1 | 8/2006 | Beeson et al. |
| 2006/0187890 | A1 | 8/2006 | Lin |
| 2007/0002846 | A1 | 1/2007 | Rada et al. |
| 2007/0030857 | A1 | 2/2007 | Fulknier et al. |
| 2007/0081469 | A1 | 4/2007 | Tracy et al. |
| 2007/0083606 | A1 | 4/2007 | Malik et al. |
| 2007/0147324 | A1 | 6/2007 | McGary |
| 2007/0153689 | A1 | 7/2007 | Strub et al. |
| 2007/0177555 | A1 | 8/2007 | Brueck |
| 2007/0233879 | A1 | 10/2007 | Woods et al. |
| 2007/0254727 | A1 | 11/2007 | Sewall |
| 2007/0255848 | A1 | 11/2007 | Sewall |
| 2007/0291711 | A1 | 12/2007 | Welch et al. |
| 2008/0005108 | A1 | 1/2008 | Ozzie et al. |
| 2008/0008165 | A1 | 1/2008 | Ikeda et al. |
| 2008/0039102 | A1 | 2/2008 | Sewall |
| 2008/0043626 | A1 | 2/2008 | Pham et al. |
| 2008/0043673 | A1 | 2/2008 | Johnson et al. |
| 2008/0046561 | A1 | 2/2008 | Pham et al. |
| 2008/0049630 | A1 | 2/2008 | Kozisek et al. |
| 2008/0056222 | A1 | 3/2008 | Waites |
| 2008/0117860 | A1 | 5/2008 | Rodriguez et al. |
| 2008/0159167 | A1 | 7/2008 | Ito et al. |
| 2008/0178172 | A1 | 7/2008 | Dossa et al. |
| 2008/0250478 | A1 | 10/2008 | Miller et al. |
| 2008/0259841 | A1 | 10/2008 | Deshpande |
| 2008/0267195 | A1 | 10/2008 | Belmon |
| 2008/0310407 | A1 | 12/2008 | Sewall |
| 2008/0313327 | A1 | 12/2008 | Sewall et al. |
| 2009/0007096 | A1 | 1/2009 | Chavez et al. |
| 2009/0015419 | A1 | 1/2009 | Sewall |
| 2009/0030908 | A1 | 1/2009 | Kawabe |
| 2009/0063667 | A1 | 3/2009 | Smith et al. |
| 2009/0109959 | A1 | 4/2009 | Elliott et al. |
| 2009/0129319 | A1 | 5/2009 | Buddhikot et al. |
| 2009/0138447 | A1 | 5/2009 | Kalavade |
| 2009/0147700 | A1 | 6/2009 | Sewall |
| 2009/0168789 | A1 | 7/2009 | Wood |
| 2009/0172658 | A1 | 7/2009 | Wood |
| 2009/0172796 | A1 | 7/2009 | Wood |
| 2009/0175285 | A1 | 7/2009 | Wood et al. |
| 2009/0180395 | A1 | 7/2009 | Wood et al. |
| 2009/0182845 | A1 | 7/2009 | Johnson |
| 2009/0207003 | A1 | 8/2009 | Brekke et al. |
| 2010/0014415 | A1 | 1/2010 | Moeller |
| 2010/0118846 | A1 | 5/2010 | Moeller |
| 2010/0202450 | A1 | 8/2010 | Ansari et al. |
| 2010/0231790 | A1 | 9/2010 | Ansari et al. |

(56) References Cited

U.S. PATENT DOCUMENTS

2011/0051703 A1 3/2011 Fulknier et al.
2011/0167157 A1 7/2011 Virgilio et al.
2011/0199932 A1 8/2011 Short et al.

OTHER PUBLICATIONS

USPTO, "Office Action in U.S. Appl. No. 12/172,862", Aug. 31, 2010.
"International Search Report and Written Opinion of the International Searching Authority for Application No. PCT/US2008/083409", May 12, 2009.
USPTO, "Office Action in U.S. Appl. No. 11/673,956 dated Dec. 22, 2010".
USPTO, "Final Office Action in U.S. Appl. No. 12/172,885 dated Nov. 2, 2010".
In Motion Technology—Take Your Business on the Road—Mobile Hotspot, "In Motion Technology, Inc. Introduces Industry's First 3G Hotspot for Passenger Productivity.", Jul. 31, 2003, Publisher: http://www.inmotiontechnology.com/newsevents/carey.html.
Mikrotik, "MikroTik Router OS V28 Reference Manual", 2005.
Peng, Dar-Tzen; Shin, K.G.; Abdelzaher, T.F., "Assignment and Scheduling Communicating Periodic Tasks in Distributed Real-Time Systems", Dec. 1997, Publisher: Software Engineering, IEEE Transactions on, vol. 23, No. 12, pp. 745-758, Dec. 1997.
USPTO, "Final Office Action in U.S. Appl. No. 12/350,407 dated Dec. 14, 2010".
USPTO, "Office Action in U.S. Appl. No. 11/673,965 dated Feb. 15, 2011".
USPTO, "Office Action in U.S. Appl. No. 12/172,862 dated Feb. 14, 2011".
US Patent and Trademark Office, Office Action, U.S. Appl. No. 12/172,862, dated Jul. 27, 2011.
US Patent and Trademark Office, Final Office Action, U.S. Appl. No. 11/673.965, dated Aug. 4, 2011.
US Patent and Trademark Office, Office Action, U.S. Appl. No. 11/673,956, dated Aug. 10, 2011.
US Patent and Trademark Office, Office Action, U.S. Appl. No. 12/350,407, dated Jul. 6, 2011.
US Patent and Trademark Office, Office Action, U.S. Appl. No. 12/350,405, dated Feb. 16, 2012.
US Patent and Trademark Office, Final Office Action dated Mar. 15, 2012 for U.S. Appl. No. 12/843,541.
US Patent and Trademark Office, Office Action, U.S. Appl. No. 12/350,402, dated Apr. 16, 2012.
Final Office Action dated Feb. 4, 2013 issued in U.S. Appl. No. 12/843,541.
Office Action issued in U.S. Appl. No. 12/843,541 dated Jul. 18, 2012.
Final Office Action issued in U.S. Appl. No. 12/172,862 dated Apr. 24, 2012.
Office Action issued in U.S. Appl. No. 12/172,862 dated Aug. 20, 2012.
Office Action dated Aug. 21, 2012 issued in U.S. Appl. No. 12/350,407.
Office Action dated Apr. 24, 2013 issued in U.S. Appl. No. 12/350,407.
Office Action dated Apr. 17, 2013 issued in U.S. Appl. No. 12/350,460.
Office Action dated Sep. 12, 2012 issued in U.S. Appl. No. 12/350,460.
Router; http://www.yourdictionary.com/telecom/router; Aug. 28, 2009.
Final Office Action dated Apr. 10, 2013 issued in U.S. Appl. No. 12/351,502.
Office Action issued in U.S. Appl. No. 12/351,502 dated Apr. 25, 2012.
Office Action issued in U.S. Appl. No. 12/351,502 dated Oct. 1, 2012.
US Patent and Trademark Office, Office Action for U.S. Appl. No. 12/351,502 dated Apr. 25, 2012.
US Patent and Trademark Office, Final Office Action for U.S. Appl. No. 12/350,407 dated Jan. 3, 2012.
US Patent and Trademark Office, Office Action for U.S. Appl. No. 12/843,541 dated Jul. 18, 2012.
US Patent and Trademark Office, Final Office Action for U.S. Appl. No. 12/172,862 dated Apr. 24, 2012.
Office Action dated Sep. 23, 2014, issued in CA 2730490.
Office Action dated Sep. 24, 2014, issued in CA 2730483.
USPTO, "Final Office Action in U.S. Appl. No. 10/936,124.", Feb. 2, 2007.
USPTO, "Final Office Action in U.S. Appl. No. 10/936,124.", Feb. 9, 2009.
USPTO, "Final Office Action in U.S. Appl. No. 10/936,124.", Jul. 11, 2007.
USPTO, "Final Office Action in U.S. Appl. No. 10/936,124.", Sep. 3, 2009.
USPTO, "Office Action in U.S. Appl. No. 10/936,124.", Apr. 10, 2008.
USPTO, "Office Action in U.S. Appl. No. 10/936,124.", Jun. 26, 2006.
Webster's, "Router", Aug. 28, 2009, Publisher: Webster's New World Telcom Dictionary 2009, Your Dictionary, www.yourdictionary.com/telecom/router.
USPTO, "Final Office Action in U.S. Appl. No. 11/673,965.", Apr. 1, 2010.
USPTO, "Office Action in U.S. Appl. No. 11/673,965.", Sep. 2, 2009.
USPTO, "Advisory Action in U.S. Appl. No. 11/376,973", Mar. 19, 2010.
R. Elz, R. Bush, "RFC 2181 Clarifications to the DNS Specification, Internet Engineering Task Force, http://tools.ietf.org/html/rfc2181, 1 page", Jul. 1997.
P. Vixie, S. Thomson, Y. Rekhter, J. Bound, "RFC 2136 Dynamic Updates in the Domain Name System (DNS Update), Internet Engineering Task Force, 51 pages.", Apr. 1997.
USPTO, "Final Office Action in U.S. Appl. No. 11/673,973.", Dec. 10, 2009.
USPTO, "Office Action in U.S. Appl. No. 11/673,973.", May 28, 2009.
Wikipedia, "Proxy Server, http://en.wikipedia.org/wiki/Proxy_server ; 9 pages,", Apr. 12, 2010.
USPTO, "Final Office Action in U.S. Appl. No. 11/673,956.", Apr. 15, 2010.
USPTO, "Office Action in U.S. Appl. No. 11/673,956.", Sep. 2, 2009.
USPTO, "Office Action in U.S. Appl. No. 12/172,885.", Apr. 26, 2010.
USPTO, "Office Action in U.S. Appl. No. 12/350,407.", Apr. 5, 2010.
PCT, "International Search Report & Written Opinion of the International Searching Authority for Application No. PCT/US2007/062077,", Nov. 20, 2007.
PCT, "International Search Report & Written Opinion of the International Searching Authority for Application No. PCT/US2007/062078,", Mar. 5, 2008.
PCT, "International Search Report & Written Opinion of the International Searching Authority for Application No. PCT/US2007/062079,", Nov. 8, 2007.
PCT, "International Search Report and Written Opinion of the International Searching Authority for Application No. PCT/US2008/076836,", Mar. 6, 2009.
Final Office Action issued in U.S. Appl. No. 12/350,407 dated Jan. 3, 2012.
Office Action issued in U.S. Appl. No. 12/172,862 dated Mar. 14, 2013.
Office Action issued in U.S. Appl. No. 12/350,405 dated Jun. 6, 2013.
Office Action issued in U.S. Appl. No. 11/673,956 dated Jul. 1, 2013.

\* cited by examiner

CONFIGURING A WIRELESS ROUTER

CROSS REFERENCE TO RELATED APPLICATIONS

This application claims the priority of provisional applications 60/987,908 entitled "Unique Default Identification Codes in Wireless Communication Systems" filed Nov. 14, 2007 and 61/019,898 entitled "Automated Update of Router Firmware" filed Jan. 9, 2008, which are both hereby incorporated by reference. This application is a continuation in part of application Ser. No. 10/936,124 entitled Device Cradle filed Sep. 8, 2004 now U.S. Pat. No. 7,764,784. Application Ser. No. 10/936,124 is incorporated herein by reference.

BACKGROUND

Wireless routers broadcast network names often referred to as SSIDs or Service Set Identifiers. Client devices receive and use network names to identify a particular wireless router with which a connection is desired. In other words, network names are intended to differentiate one wireless router from another.

To establish a connection with a wireless router, a client device receives and displays the names of the available wireless networks. The user then selects the desired wireless network. For example, suppose a user of a laptop computer equipped with WiFi communication capabilities wishes to establish a communication session with a wireless access point. The user interacts with a user interface on the laptop computer to identify the network name of the desired access point, and then proceeds to take the appropriate steps to establish a wireless connection with that access point.

Typically, when a wireless router is manufactured, it is preconfigured with a default network name. This default name is embedded in the software that is resident on the wireless router. To minimize cost and complexity in manufacturing, typically the same software is embedded into every router for a given production run. As a result, every wireless router that is manufactured with the same software will have the same network name. Often, the name corresponds to the manufacturer or model number of the wireless router.

In environments where only one network name is broadcast, there is no ambiguity in identifying and establishing the correct communication link. However, in situations where multiple wireless networks are available, the user must rely on the broadcasted network name to identify the correct device with which to establish the communication link. If two or more candidate wireless routers share the same default network name, the user will not be able to distinguish between the two devices, and is forced to rely on trial and error or some other inefficient means to identify and establish the correct connection.

Wireless router manufacturers generally provide some form of administration tool allowing a user to replace the non-unique default network name. For example, many wireless routers can serve an administration web page to a computer that is connected to the wireless access point. From this administration web page, the user can replace the default network name with a unique value. In this manner, the user can create a more unique network name for the access point. If chosen properly, this new name can distinguish one wireless router from all other WiFi devices within radio range. Unfortunately, manually setting an SSID can prove error prone and burdensome. Even when the user is comfortable with manually setting the SSID, there is no reasonable assumption that the user selected name is unique with respect to other names not currently within radio range. Having a unique SSID can prove beneficial when the user is moves from place to place.

DETAILED DESCRIPTION

INTRODUCTION: Manual management of SSID's or network names can prove impractical. Wireless routers that connect to the Internet via a data capable cellular device can be small, battery powered, and may be in operation practically anywhere a cellular data connection is available. Being mobile in nature, such routers often move around as much as the WiFi devices that will link to them. It can be very difficult if not impossible to avoid naming conflicts by manually managing the network names. For example, two people may manually configure their respective wireless routers to be "Bob" or "Janet."

Various embodiments allow wireless routers to each maintain a unique default network name even when reset to factory defaults. Embodiments discussed below utilize the hardware address of a wireless router to generate one or more codes. Embedded programming functions to configure the wireless router by setting the code or codes as one or both of a network name for the wireless router and a device password for accessing features of the wireless router. In a particular example, that programming applies an algorithm to the hardware address so that the resulting network name and device password are unique when compared to names and passwords being used by other wireless routers. The algorithm may operate to add the hardware address or a portion thereof to a static alpha-numeric string to generate the code or codes. For example, a static string may be the text "RouterCo" identifying a manufacturer. The generated code could then be "RouterCo-3g23adf35" where "3g23adf35" is the hexadecimal representation of the hardware address. Since the hardware address is unique to each wireless router, the algorithm can generate a code that is also unique.

Figure 1:
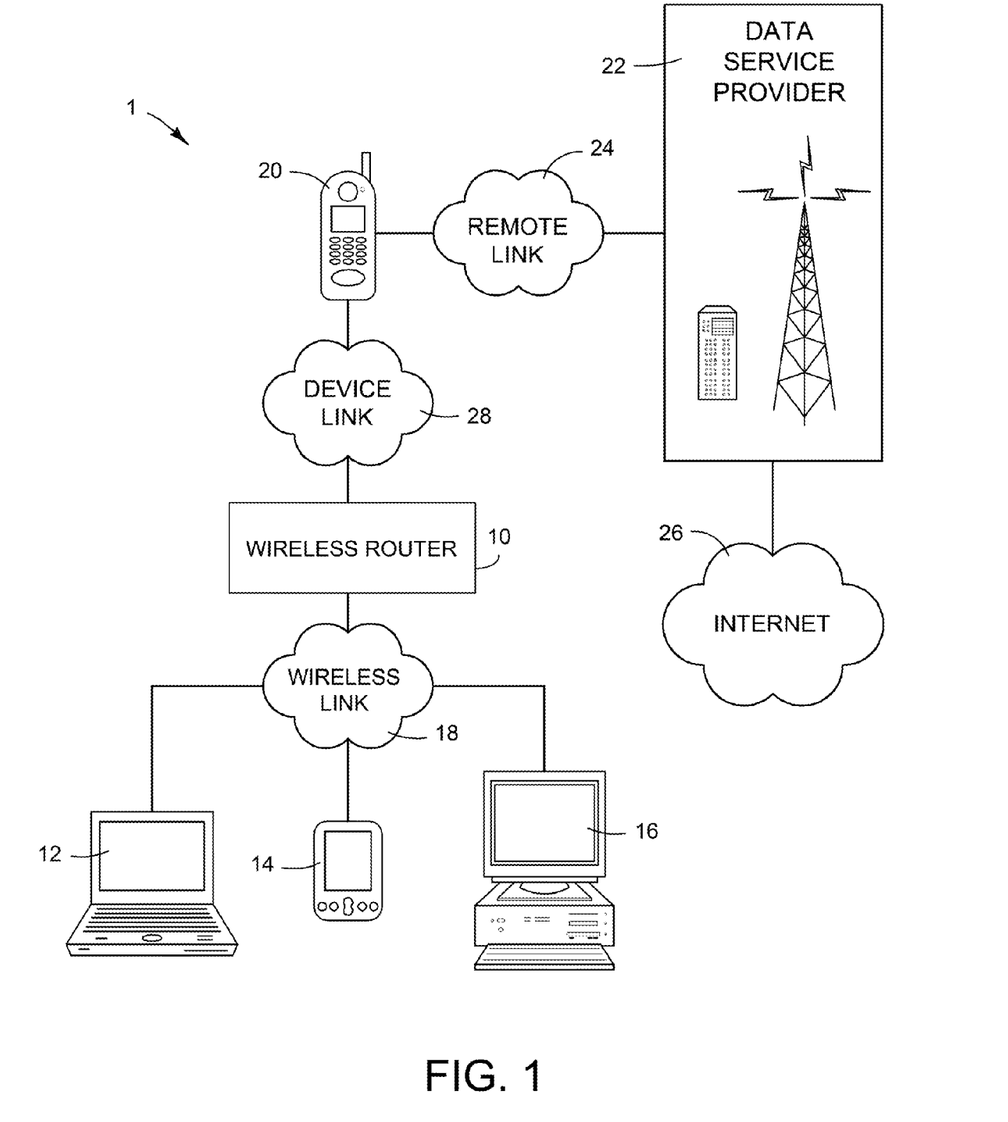
FIGS. 1 and 2 illustrate an exemplary block diagrams of environments in which embodiments of the present invention may be implemented.

ENVIRONMENT: FIG. 1 illustrates exemplary environment 1 in which various embodiments of the present invention may be implemented. Environment 1 includes wireless router 10 and clients 12, 14, and 16 and wireless link 18. Wireless router 10, discussed in more detail later, represents generally a device capable or routing network communications between clients 12, 14, and 16 and internet 26 via a data exchanger 20. Clients 12, 14, and 16 represent generally any computing devices capable of communicating with wireless router 10.

Wireless link 18 interconnects wireless router 10 and clients 12, 14, 16. Wireless link 18 represents generally any wireless link allowing electronic data communication between devices 10, 12, 14, and 16. Wireless link 18 may, for example, be a radio link implemented using a protocol such as IEEE 802.11.

Environment 1 also includes data exchanger 20 and service provider 22. Data exchanger 20 represents generally any combination of hardware and/or programming that can be utilized by wireless router 10 to connect to a remote network such as the internet. While illustrated as an internet enabled cellular telephone, data exchanger 20 is not so limited. For example, data exchanger 20 may be a PCMCIA card or other device capable of cellular data communication. Internet enabled cellular telephones and other devices that are capable of data communications over a cellular network are referred to herein as data capable cellular devices. Other examples for data exchanger 20 include but are not limited to DSL modems and cable modems.

Service provider 22 represents generally any infrastructure configured to provide internet related data services to subscribers such as an owner of data exchanger 20. For example, where data exchanger 20 is a data capable cellular device, service provider 22 may be a cellular telephone service provider capable of providing voice and data services to subscribers allowing access to internet 26. Where data exchanger 22 is a DSL or cable modem, service provider 22 may be a more traditional internet service provider (ISP) providing data access to internet 26.

Remote link 24 serves as a common communications link through which communications are routed between internet 26 and clients 12, 14, and 16. Remote link 24 interconnects data exchanger 20 and service provider 22 and represents generally any combination of a cable, wireless, or remote connection via a telecommunication link, an infrared link, a radio frequency link, or any other connector or system that provides electronic communication between data exchanger 20 and service provider 22.

In the embodiment illustrated in environment 1, device link 28 interconnects wireless router 10 and data exchanger 20. Device link 28 represents generally any combination of a cable, wireless, or remote connection via a telecommunication link, an infrared link, a radio frequency link, or any other connector or system that provides electronic communication between devices 10 and 20. As examples, device link 28 may incorporate a physical USB cable or radio waves carrying Bluetooth communications.

Communication between clients 12, 14, and 16 and internet 26 is dependent upon wireless router 10. Wireless router 10, as discussed below with respect to FIGS. 3-6, includes components capable of collecting individualized usage information from clients 12, 14, and 16 accessing the Internet via remote link 24 using a data plan assigned to data exchanger 20. Wireless router 10 is also capable of communicating the usage information to an interested server in the internet 26.

Figure 2:
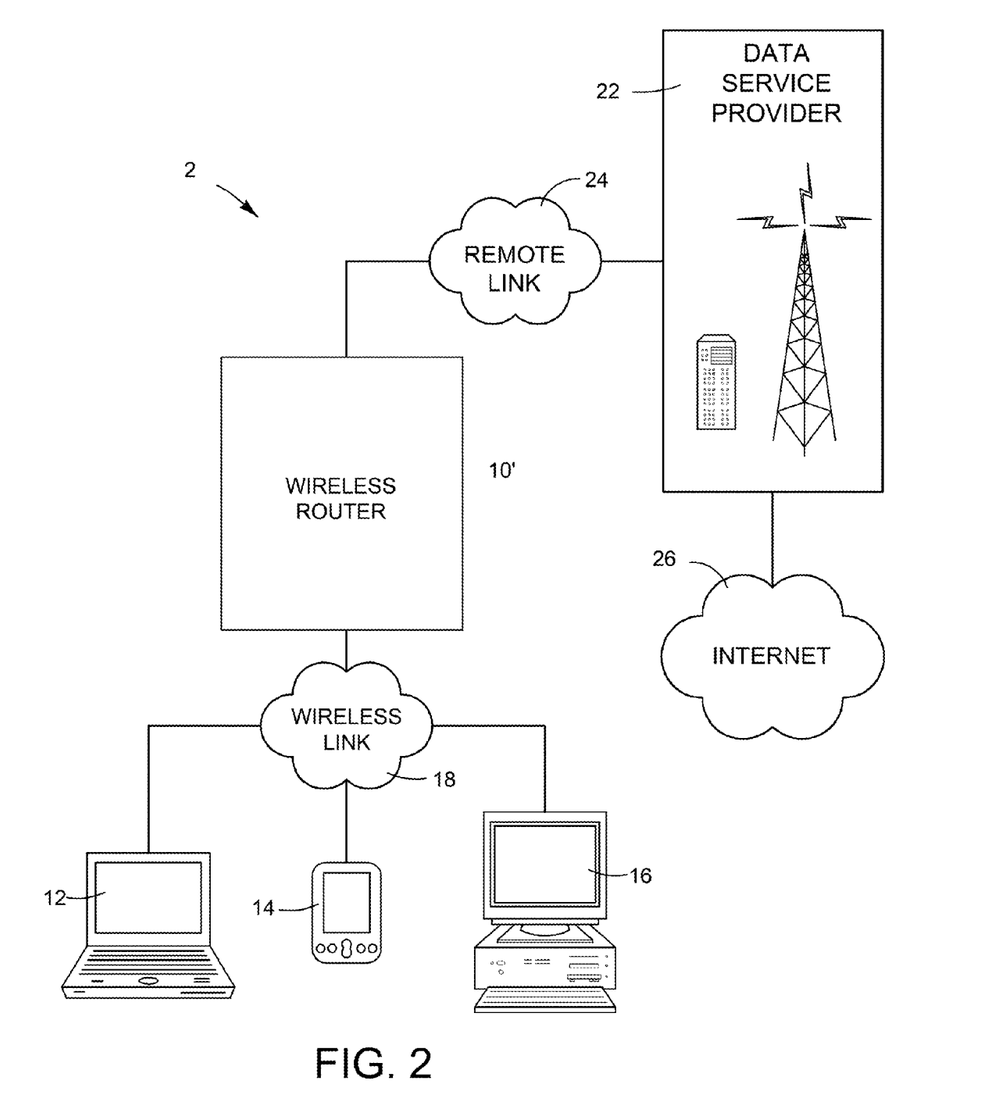

FIG. 2 illustrates another exemplary environment 2 in which various embodiments of the present invention may be implemented. In the example of FIG. 2, data exchanger 20 (not shown) and wireless router 10 are incorporated within the same device. Device link 28 (shown in FIG. 1) is eliminated and replaced with internal connections. In such a scenario, data exchanger may take the form of a PCMCIA card or any other device that can be inserter into a slot or otherwise coupled to wireless router 10. Alternatively, data exchanger 20 may be fully integrated into wireless router 10.

Figure 3:
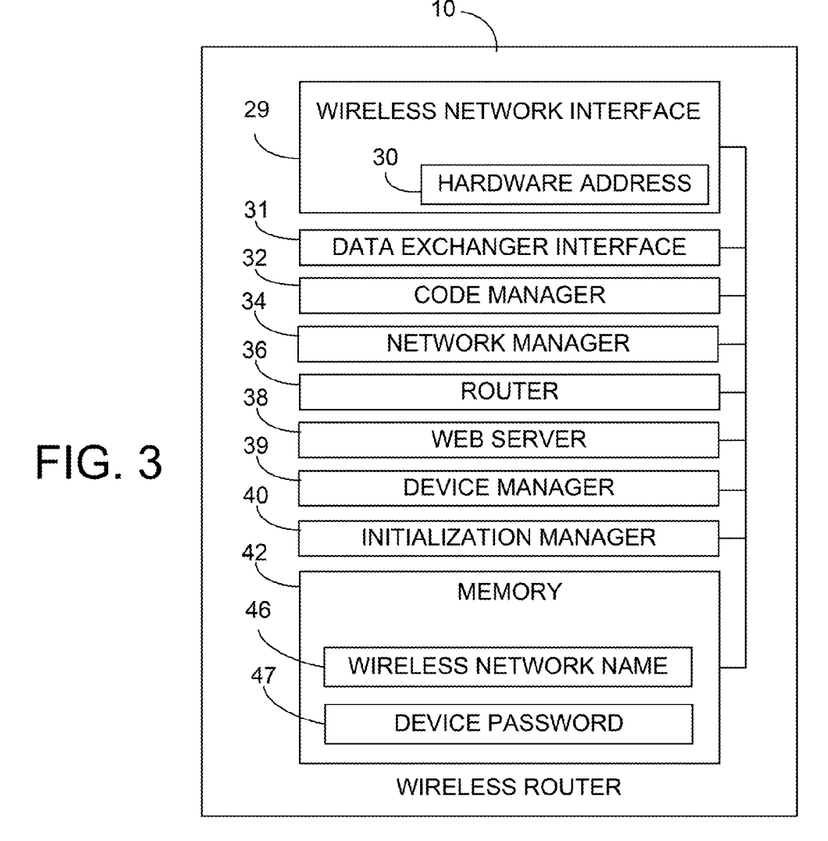
FIGS. 3-4 are block diagrams showing physical and logical components of a wireless router according to an embodiment of the present invention.

WIRELESS ROUTER: FIG. 3 is a block diagram illustrating physical and logical components of wireless router 10. As described above, wireless router 10 represents generally any combination of hardware and programming capable of directing network communications between clients and the internet via a data exchanger such as a data capable cellular device, DSL modem, or cable modem.

In the example of FIG. 3 wireless router 10 includes wireless network interface 29 and data exchanger interface 31. Wireless network interface 29 represents generally any combination of hardware and/or program instructions capable of enabling wireless communication between wireless router 10 and clients 12, 14, and 16 shown in FIGS. 1 and 2. In the example of FIG. 3, wireless network interface 29 includes its own memory storing hardware address 30. Hardware address 30 represents the hardware address assigned to wireless network interface 29 and thus to wireless router 10 when assembled. Data exchanger interface 31 represents any combination of hardware and/or programming enabling data to be communicated between wireless router 10 and a data exchanger 20 shown in FIG. 1. For example, interfaces 29 and 31 may include a transceiver operable to exchange network communications utilizing a wireless protocol such as ultrawideband (UWB), Bluetooth, or IEEE 802.11. Interface 31 may include physical ports or other physical connection points enabling wired communication. Wireless network interface 29 may, for example, be a WiFi interface utilizing an 802.11 protocol or some other wireless protocol.

Figure 4:
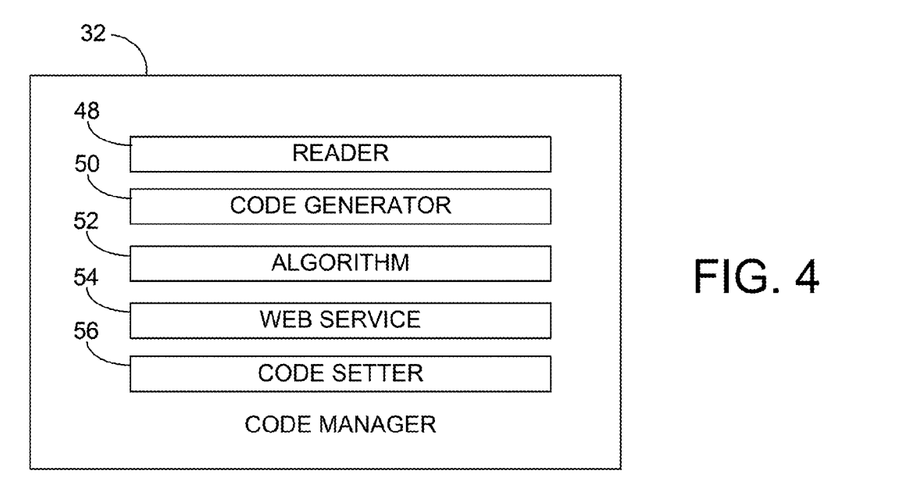

Wireless router 10 includes code manager 32 and network manager 34. Code manager 32, discussed in more detail below with respect to FIG. 4, represents generally any combination of hardware and programming capable of automatically generating and setting one or both of a network name and a device password for wireless router 10 as well as enabling a user to manually set a network name and a device password. Network manager 34 represents generally any combination of hardware and programming capable of utilizing wireless network interface 29 to broadcast the network name set for wireless router 10. Network manager 34 is also responsible for establishing a local area network with one or more clients requesting a wireless connection to the wireless router using the network name. For example, network manager 34 is responsible for receiving and granting connection requests directed to wireless router 10 made using the broadcasted network name. In doing so, network manager 34 may require a password and may allow access to only those clients with known hardware addresses.

Wireless router 10 also includes router 36, web server 38, device manager 39, initialization manager 40, and memory 42. Router 36 represents generally any combination of hardware and/or programming for routing network communication received through wireless network interface 29 to be transmitted by data exchanger 20 to internet 26. Router 36 is also responsible for routing inbound network communications received from internet 26 and directed via wireless network interface 29 to a specified client 12, 14, or 16. Outbound and inbound network communications, for example can be an IP (internet Protocol) packets directed to a target on internet 26 or to a particular network device 12, 14, or 16 on a local area network.

Web server 38 represents generally any combination of hardware and programming capable of serving interfaces such as web pages to client devices 12, 14, and 16. Such web pages may include web pages that when displayed allow a user to provide or otherwise select settings related to the operation of wireless router 10. For example, a given page may allow a user to manually select a network name.

Device manager 39 represents generally any combination of hardware and programming capable of managing the configuration of wireless router 10 as well as interacting with a client device to supply status information concerning wireless router, data exchangers being utilized by wireless router 10 and any remote links established by those data exchangers. Device manager 39 is responsible for generating or otherwise supplying one or more configuration web pages to web server 38 to be returned via web server 38 to a requesting client. The configuration pages may include information relating to the operating states of wireless router 10. The configuration pages may also include controls enabling a user to request changes to the operating state of wireless router 10. Such changes are received by web server 42 and implemented by device manager 39.

To limit access, device manager 39 may require a user to supply a password before the user is allowed to manipulate wireless router 10 via a configuration page. The password may be set by code manager 32 and, if desired, later changed by the user. For example, when a user first requests a configuration page by browsing to an IP address assigned to router device 10 on the user's local network, device manager 39 causes web server 38 to return a log-in page requesting the password. Only when the user supplies the correct password does device manager 39 provide the configuration pages to the user.

Device manager 39 may also limit the router functions available based upon a user supplying a password. For example, the password may be used as the default password to allow the user of a wirelessly connected computer to gain access to some portion of router features, such as the ability to get beyond a set of welcome pages and gain access the internet.

Initialization manager 40 represents generally any combination of hardware and programming capable of, upon starting of the wireless router 10, to determine if the network name or the device password has been manually set. The term starting as used herein refers to powering on or otherwise resetting wireless router 10. If it is determined that either or both of the network name and device password has not been manually set, initialization manager causes code manager 32 to automatically generate and set the missing network name and/or the device password. The manner in which the network name and device password are generated is discussed in more detail below with respect to FIG. 4. If it is determined that the network name or device password has been manually set, initialization manager 40 prevents code manager 32 from generating the network name or device password. Network manager 34 can then broadcast either the automatically generated network name or the manually set network name using wireless network interface 29. Device manager 39 can then limit access to the configuration pages using the automatically generated or manually set device password.

Memory 42 represents generally any memory device or devices capable of storing data that can be accessed by other components of wireless router 10. While shown as a single device, memory 42 may include multiple memory devices. In the Example of FIG. 3, memory 42 is shown to include network name 46. Network name 46 represents the network name that has either been automatically generated or manually set for wireless router 10. Device password 47 represents the device password for accessing configuration pages for router device 10. As discussed below, code manager 32 may utilize hardware address 30 to generate network name 46 and device password 47.

FIG. 4 is a block diagram illustrating the logical components of code manager 32. In the Example of FIG. 4, code manager 32 is shown to include reader 48, name generator 50, algorithm 52, web service 54, and code setter 56. Reader 48 represents generally any programming capable of reading data that can be used to generate a network name. In one example, reader 48 is responsible for reading or otherwise acquiring hardware address 30. In another example, reader 48 is responsible for utilizing data exchanger interface 31 to read or otherwise acquire information from data exchanger 20 that can be used to generate a network name. Where data exchanger 20 is a data capable cellular device, such information may include a phone number assigned to or other data obtainable from data exchanger 20. Other data might be obtained from an address book maintained on data exchanger 20 or a storage location in data exchanger 20 where the user can explicitly set the network name.

Code generator 50 represents generally any programming capable of utilizing information obtained by reader 48 to generate a code to be set as one or both of a network name and a device password. In performing its task, name generator may utilize algorithm 52. Algorithm 52 can be any data that can be used to act on information obtained by reader 48 to create the network name 46 and the device password 47. It is noted that code generator may, for security reasons, generate different codes for the network name and the device password. In doing so, code generator 50 may use the same algorithm in different manners to generate two distinct codes, or code generator 50 may use different algorithms If the latter is true, algorithm 52 represents two or more different algorithms.

In one example, algorithm 52 combines all or a portion of the information obtained by reader 48 with a static alphanumeric string to generate a code. For example, a static string may be the text "RouterCo" identifying a manufacturer. The generated network name or device password could then be "RouterCo-3g23adf35" where "3g23adf35" is the hexadecimal representation of the hardware address. The hardware address portion could instead be the telephone number or other data obtained from data exchanger 20.

To avoid broadcasting the hardware address of the wireless router, algorithm 52 may be more complex. For example, algorithm 52 may be asymmetric such that the hardware address cannot be discerned from the generated network name. Furthermore, the network name generated using algorithm 52 may be relatively rare rather than entirely unique. For example, algorithm 52 might operate on only part of the hardware address or might produce a shorter variable portion of the wireless network address or device password such as "routerco-a2e"

Web service 54 represents generally any programming capable of being utilized by web server 38 to provide a web page that enables a user to manually select a network name and a device password. Code setter 56 represents generally any programming capable of setting the network name and device password generated by name generator 50 or the network name and device password manually selected using web service 54 as the network name and device password for wireless router 10. In performing its task, code setter 56 may save that automatically generated or manually set network name and device password as network name 46 and device password 47 in memory 42. Once saved in memory, network manager 34 can acquire and broadcast network name 46 while device manager 37 can limit access to configuration pages using device password 47.

Figure 5:
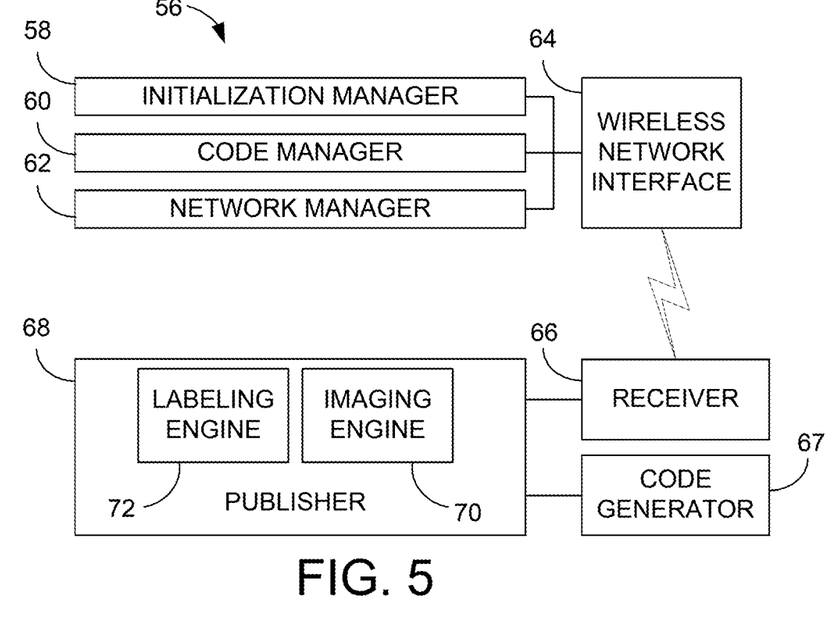
FIG. 5 is a block diagram showing physical and logical components responsible for marking a wireless router according to an embodiment of the present invention.

FIG. 5 is a block diagram illustrating a system 56 for marking a wireless router with a network name and a device password. As shown, system 56 includes initialization manager 58, code manager 60, network manager 62, and wireless network interface 64. It is noted that components 58-64 may be components of a wireless router being manufactured. Initialization manager 58 is responsible for powering on or otherwise resetting the device. It is presumed that a device password and a network name have not been manually set for the device. As a result, initialization manager 58 causes code manager 60 to generate and set a network name and a device password. As explained above, code manager 60 can generate a code or codes from the hardware address of the wireless router. The code or codes can then be set as the device password and network name. Network manager 62 utilizes wireless network interface 64 to broadcast the network name.

System 56 is also shown to include receiver 66, code generator 67 and publisher 68. Receiver 66 represents generally any device capable of receiving a network name broadcast by wireless network interface 64. Code generator 67 represents generally any device or combination of hardware and programming capable of obtaining the hardware address of the wireless router and generating the same code or codes from that hardware address as code manager 60. For example, code generator 67 may apply the same algorithm to the hardware address. To obtain the hardware address, code generator may include a physical interface for accessing the hardware address 30 from the memory of wireless network interface 29 directly or via wireless router 10. In another example, code generator 67 may include a scanner such as a bar code scanner that can read the hardware address from a label applied to wireless network interface 29 or to wireless router 10.

In another example wireless network interface 64 may broadcast hardware address 30. Receiver 66 may receive that broadcast and pass hardware address 30 on to code generator 67. Code generator 67 may then, as discussed above, use the hardware address 30 to generate the same code or codes from that hardware address as code manager 60.

Publisher 68 represents generally any device or combination of devices capable of being used to mark a wireless router with a network name received by receiver 66 and/or a code generated by code generator 67. Marking as used herein means applying a human readable representation of the network name or code to the wireless router. In the Example of FIG. 5, publisher 68 is shown to include imaging engine 70 and labeling engine 72. Imaging engine 70 represents generally any device capable of printing the received network name or generated code on a label. Labeling engine 72 represents generally any device capable of being used to apply a printed label to a wireless router. Receiver 66, code generator 67 and publisher 68 may be integrated into a single device. In one implementation, that device may be a hand held implement capable of printing and applying the label to an enclosure to each wireless router of a production run before that device is packaged and sold. In this manner, the purchaser is provided with a device that has a unique default network name and/or password that can be easily identified by viewing the label.

Figure 6:
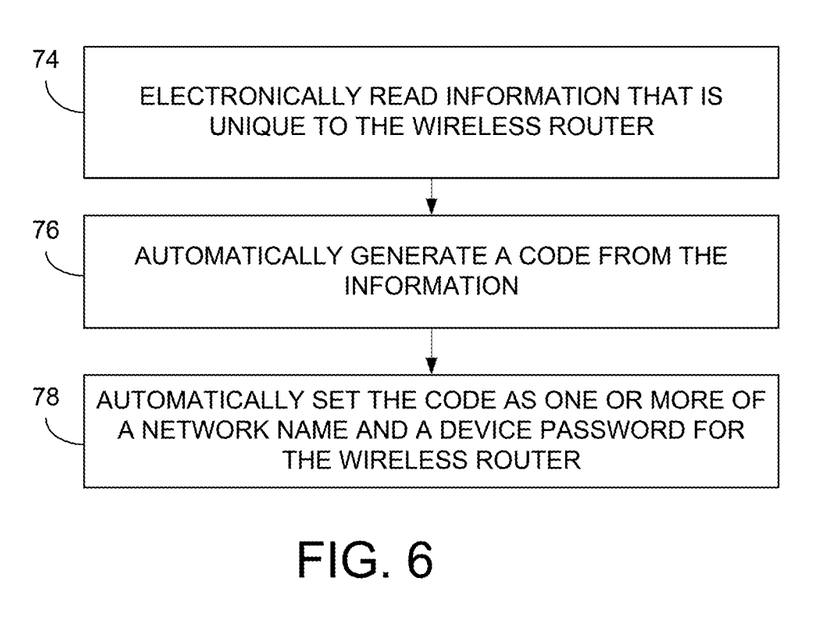
FIGS. 6-8 are exemplary flow diagram illustrating steps taken in performance of various embodiments of the present invention.
Figure 7:
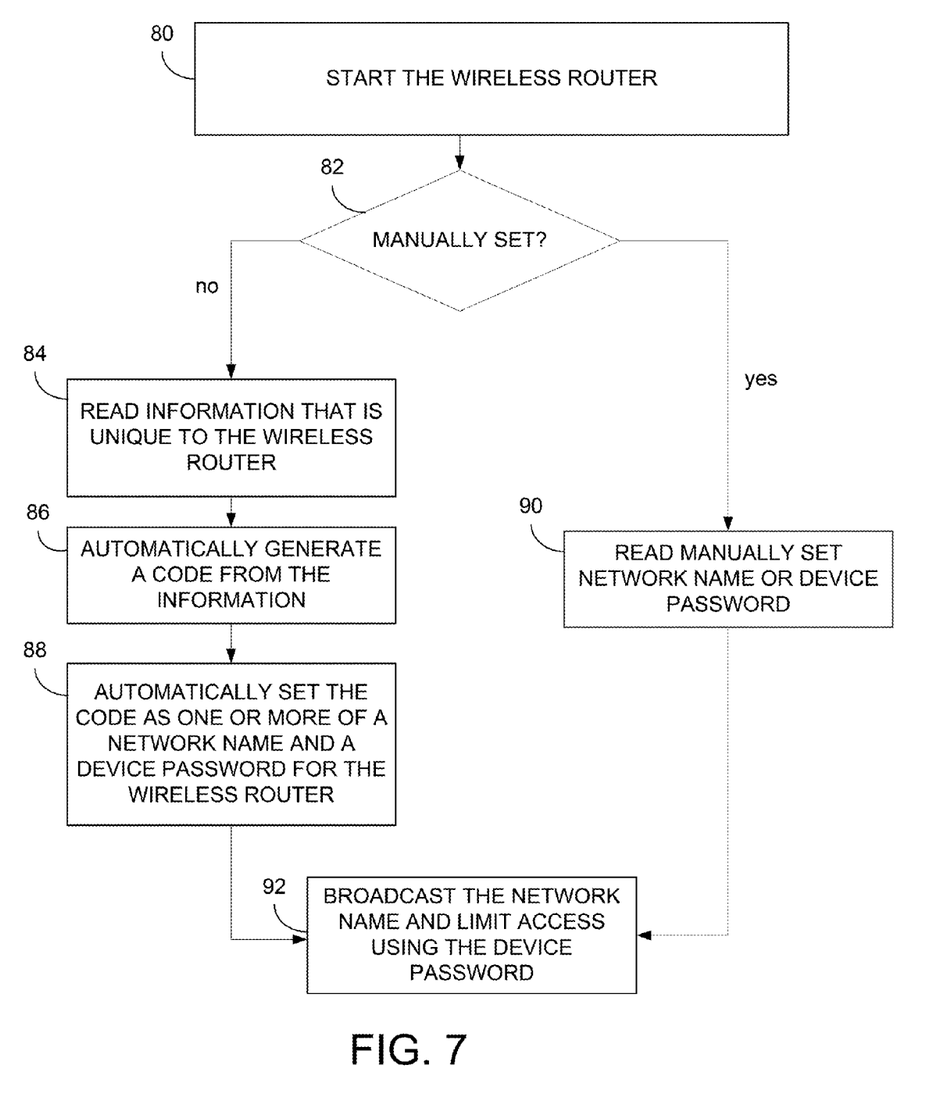
Figure 8:
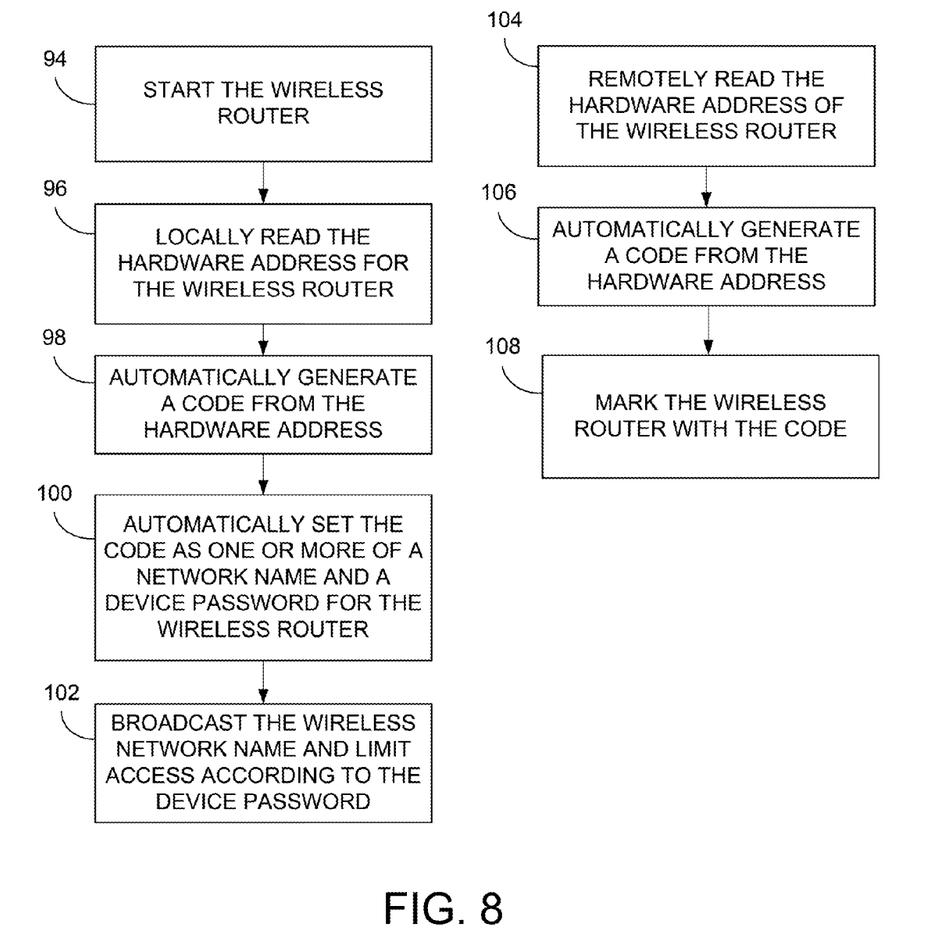

OPERATION: FIGS. 6-8 ere exemplary flow diagram illustrating steps taken in performance of various embodiments. Starting with FIG. 6, information that is unique to the wireless router is read (step 74). Step 74 may involve reading a hardware address assigned to the wireless router. Step 74 may involve reading a data from a data exchanger in communication with the wireless router. For example, where the data exchanger is a data capable cellular device, that data may be a phone number or information from an address book or even data created by a user to be used as the network name.

A code is automatically generated from the information read in step 74 (step 76). Step 76 may involve using the read information or a portion thereof as the code. Instead, the information or portion thereof may be appended to a predetermined alpha-numeric string to generate the code. In another implementation, step 76 may involve applying an algorithm to the information to create the code. Where, for example, the information is a hardware address or other potentially sensitive information, that algorithm may be asymmetrical so that the resulting code cannot be used to discern the information read in step 74.

The code generated in step 76 is automatically set as one or more of a network name and a device password for the wireless router (step 78). The wireless router can then broadcast the network name allowing client devices to request and establish wireless connections and limit access to router features using the device password. In a given implementation, the code generated in step 76 is marked on the wireless router, so the user can easily identify the one or both of the network name and device password. Once the network name is known, the user can then discern the wireless router from other devices broadcasting other network names. With the device password, the user can access features such as configuration pages served by the wireless router.

It is noted that step 76 can involve generating a first code and a second code that is different than the first code. Step 78 can then involve setting the first code as the network name and setting the second code as the device password. Because the network name is broadcasted, it may be important to ensure that the device password is different to maintain an acceptable level of security.

FIG. 7 is a flow diagram illustrating steps taken when initializing a wireless router. By initializing it is meant that the steps taken after the device is powered on or reset. The wireless router is started (step 80). Step 80 can involve resetting the device or powering the device components to an "on" state from an "off state."

It is then determined if a network name or a device password has been manually set for the wireless router (step 82). Referring back to FIG. 3, step 82 may be performed by examining memory 42. In a given example, a flag may be set in memory 42 indicating that network name 46 or device password was manually set. If, in step 82, it is determined that the network name or device password has not been manually set, the process continues with steps 84-88. If it is determined that the network name or device password has been manually set, the process jumps to step 90.

Assuming the determination in step 82 reveals that one or both of the network name and device password has not been manually set, information that is unique to the wireless router is read (step 84). Step 84 may involve reading a hardware address assigned to the wireless router. Step 84 may involve reading a data from a data exchanger in communication with the wireless router. For example, where the data exchanger is a data capable cellular device, that data may be a phone number or information from an address book or even data created by a user to be used as the network name.

A code is automatically generated from the information read in step 84 (step 86). Step 86 may involve using the read information or a portion thereof as the code. Instead, the information or portion thereof may be appended to a predetermined alpha-numeric string to generate the code. In another implementation, step 86 may involve allying an algorithm to the information to create the code. Where, for example, the information is a hardware address or other potentially sensitive information, that algorithm may be asymmetrical so that the resulting code cannot be used to discern the information read in step 84. The code generated in step 86 is automatically set as one or more of the network name and device password for the wireless router (step 88).

When the determination in step 82 reveals that the network name or device password has been manually set, that network name and/or device password is read (step 90). The wireless router then broadcasts the network name and limits access to features of the wireless router using the device password (step 92). The broadcast network name and device password used in step 92 are either the network name and/or device password automatically set in step 88 or the network name and/or device password read in step 90 depending on the outcome of Step 82. In a given example, the device password may have been manually set while the network name was not. In such a case, steps 84-88 are followed to set the network name while step 90 is followed to read the device password. It is also true that the device password may not be manually set while the network name has. Here, steps 84/86 are followed to set the device password and step 90 is followed to read the network name.

FIG. 8 is a flow diagram illustrating steps taken to mark a wireless router with a network name. The wireless router is started (step 94). Step 94 can involve resetting the device or powering the device components to an "on" state from an "off" state."

A hardware address assigned to the wireless router is read locally at the wireless router (step 96). A code is automatically generated from the information read in step 96 (step 98). Step 98 may involve using the hardware address or a portion thereof as the code. Instead, the hardware address or portion thereof may be appended to a predetermined alpha-numeric string to generate the code. In another implementation, step 98 may involve applying an algorithm to the hardware address to create the code. Since the hardware address may be considered sensitive information, that algorithm may be asymmetrical so that the resulting code cannot be used to discern the hardware address read in step 96. The code generated in step 98 is automatically set as one or more of a network name and a device password for the wireless router (step 100). The network name is then broadcasted (step 102).

The hardware address of the wireless router is then remotely read (step 104). The term remotely is used here to mean that a device other than the wireless router reads the hardware address. Step 104 may be implemented by connecting to the wireless router or to the wireless network interface to access the hardware address from memory. In another example, the hardware address may be scanned from a code such as a bar code from a label placed on the wireless network interface or wireless router. A code is then generated from the hardware address read in step 104 (step 106). It is presumed that the code generated in step 106 is generated in the same manner as the code generated in step 98. For example, where the code is generated using an algorithm, the same algorithm is used in steps 98 and 106. The wireless router is marked with the code generated in step 106 (step 108). Step 108, for example, may involve printing the code on a label and applying that label to the wireless router. Thus, an end user can easily identify one or both of the network name and the device password.

CONCLUSION: The various embodiments described above discuss configuring a wireless router by generating a code and then setting the code as one or more of a network name and a device password for the router device. As discussed "generating a code" can mean generating a single as well as generating two or more distinct codes. Further, a given implementation may involve configuring the wireless router by setting one code as the network name and a different code as the device password. In another implementation, configuring may involve generating one code and setting that code as the network name ignoring the device password altogether. Likewise, configuring may involve generating one code and setting that code as the device password ignoring the network name altogether. Thus setting a generated code as one or more of a network name and a password for the wireless router can involve (a) only setting the code as the network name; (b) only setting the code as the device password; or (c) setting a first code as the network name and a second code as the device password.

The schematic diagrams of FIGS. 1 and 2 illustrate exemplary environments in which embodiments of the present invention may be implemented. Implementation, however, is not limited to these environments. The diagrams of FIGS. 3-5 show the architecture, functionality, and operation of various embodiments of the present invention. A number of the blocks are defined, at least in part, as programs or programming. Each of those blocks may represent in whole or in part a module, segment, or portion of code that comprises one or more executable instructions to implement the specified logical function(s). Each block may represent a circuit or a number of interconnected circuits to implement the specified logical function(s).

Also, the present invention can be embodied in any computer-readable media for use by or in connection with an instruction execution system such as a computer/processor based system or an ASIC (Application Specific Integrated Circuit) or other system that can fetch or obtain the logic from computer-readable media and execute the instructions contained therein. "Computer-readable media" can be any media that can contain, store, or maintain programs and data for use by or in connection with the instruction execution system. Computer readable media can comprise any one of many physical media such as, for example, electronic, magnetic, optical, electromagnetic, or semiconductor media. More specific examples of suitable computer-readable media include, but are not limited to, a portable magnetic computer diskette such as floppy diskettes or hard drives, a random access memory (RAM), a read-only memory (ROM), an erasable programmable read-only memory, or a portable compact disc.

Although the flow diagrams of FIGS. 6-8 show specific orders of execution, the orders of execution may differ from that which is depicted. For example, the order of execution of two or more blocks may be scrambled relative to the order shown. Also, two or more blocks shown in succession may be executed concurrently or with partial concurrence. All such variations are within the scope of the present invention.

The present invention has been shown and described with reference to the foregoing exemplary embodiments. It is to be understood, however, that other forms, details and embodiments may be made without departing from the spirit and scope of the invention that is defined in the following claims.

What is claimed is:

1. A method for configuring a wireless router, comprising:
electronically reading information that is unique to a wireless router;
electronically reading a predetermined alpha-numeric static data string that is common to both the wireless router and at least one other wireless router of a same manufacturer, wherein the predetermined alpha-numeric static data string is determined before the wireless router is placed into service;
automatically generating a code from the information and the predetermined alpha-numeric static data string;
automatically setting the automatically generated code as a network name for the wireless router, wherein the network name differentiates a wireless network of the wireless router from a wireless network of another wireless router;
marking the wireless router with a physical representation of the code;
wherein reading, generating, and setting are performed by the wireless router, and wherein the automatically generating a code from the information comprises one of:
  combining at least a portion of the information with the predetermined alpha-numeric static data string to generate the code; or
  applying an algorithm to the information to generate a unique data string and combining the unique data string with the predetermined alpha-numeric static data string to generate the code.

2. The method of claim 1, further comprising generating a second code different from the first code and automatically setting the second code as a password for the router.

3. The method of claim 2:
  further comprising automatically determining if the device password for the wireless router has been manually set prior to setting the generated second code as the password for the wireless router; and
  wherein the acts of generating the second code and automatically setting the second code are performed only if the act of determining reveals that the password for the wireless router has not been manually set.

4. The method of claim 1, wherein electronically reading information that is unique to the wireless router comprises electronically reading one of a hardware address assigned to the wireless router and data from a data capable cellular device in communication with the wireless router.

5. The method of claim 1, wherein the information is a hardware address of the wireless router, the method further comprising marking the wireless router with a physical representation of the code.

6. The method of claim 5, wherein marking comprises:
  remotely reading the information that is unique to the wireless router;
  automatically generating the code from the remotely read information;
  generating a label that includes the physical representation of the code; and
  affixing the label to the wireless router.

7. The method of claim 5, wherein marking comprises:
  causing the wireless router to broadcast the code that was set as the network name;
  receiving the broadcasted code;
  generating a label that includes the physical representation of the code; and
  affixing the label to the wireless router.

8. The method of claim 5, wherein marking comprises:
  causing a wireless network interface to broadcast the information that is unique to the wireless router;
  receiving the broadcasted information;
  automatically generating the code from the received information
  generating a label that includes the physical representation of the code; and
  affixing the label to the wireless router.

9. The method of claim 1, further comprising broadcasting the network name for the wireless router.

10. The method of claim 1, wherein the unique data string and the predetermined alpha-numeric static data string each identify the manufacturer of the router when either the unique data string or the predetermined alpha-numeric static data string are used to generate the code.

11. The method of claim 1 wherein the predetermined alpha-numeric static data string is assigned by the same manufacturer.

12. A non-transitory computer readable medium storing computer executable instructions that when executed implement a method for configuring a wireless router, the medium including instructions for:
  electronically reading information unique to a wireless router;
  electronically reading a predetermined alpha-numeric static data string that is common to both the wireless router and at least one other wireless router of a same manufacturer, wherein the predetermined alpha-numeric static data string is determined before the wireless router is placed into service;
  automatically generating a code from the information and the predetermined alpha-numeric static data string;
  automatically setting the automatically generated code as a network name for the wireless router, wherein the network name differentiates a wireless network of the wireless router from a wireless network of another wireless router,
  wherein the instructions further comprise instructions to enable the marking of the wireless router with a physical representation of the code; and
  wherein electronically reading, electronically generating, and automatically setting are performed by the wireless router, and wherein the instructions for automatically generating a code from the information include instructions for one of:
    combining at least a portion of the information with the predetermined alpha-numeric static data string to generate the code; or
    applying an algorithm to the information to generate a unique data string and combining the unique data string with the predetermined alpha-numeric static data string to generate the code.

13. The medium of claim 12, further comprising automatically generating a second code different from the first code and automatically setting the second code as the device password.

14. The medium of claim 13 having further instructions for:
  automatically determining if one or more of the network name and the device password for the wireless router has been manually set prior to setting the generated code as the network name or the wireless password for the wireless router;
  preventing execution of the instructions for automatically setting the code as the network name if execution of the instructions for determining reveals that the network name for the wireless router has been manually set; and
  preventing execution of the instructions for automatically setting the code as the device password if execution of the instructions for determining reveals that the device password for the wireless router has been manually set.

15. The medium of claim 14 having further instructions for broadcasting the network name automatically or manually set for the wireless router.

16. The medium of claim 12, wherein the instructions for electronically reading information unique to the wireless router include instructions for electronically reading one of a hardware address of the wireless router and data from a data capable cellular device in communication with the wireless router.

17. The medium of claim 12, wherein the unique data string and the predetermined alpha-numeric static data string each comprise an identifier for the manufacturer of the router.

18. A wireless router, comprising:
  a wireless network interface;

a code manager configured to read information that is unique to the wireless router, read a predetermined alpha-numeric static data string that is common to both the wireless router and at least one other wireless router of a same manufacturer, wherein the predetermined alpha-numeric static data string is determined before the wireless router is placed into service, generate a code from the information and the predetermined alpha-numeric static data string, and automatically set the generated code as a network name for the wireless router, wherein the network name differentiates a wireless network of the wireless router from a wireless network of another wireless router;

a network manager configured to cause the wireless network interface to broadcast the network name and to establish a local area network with one or more clients requesting a wireless connection to the wireless router using the network name;

a router configure to utilize the wireless network interface to broadcast data to and receive data from the one or more clients connected to the wireless router; and a device manager configured to utilize a device password to limit access to the wireless router, wherein the code manager is configured to enable the marking of the wireless router with a physical representation of the code; and wherein the code manager is configured to generate the code by one of:
- combining at least a portion of the information with the predetermined alpha-numeric static data string to generate the code; or
- applying an algorithm to the information to generate a unique data string and combining the unique data string with the predetermined alpha-numeric static data string to generate the code.

19. The wireless router of claim 18, wherein the code manager is configured to generate a second code different from the first code, and to set the second code as the device password.

20. The device of claim 19, wherein the code manager is configured to enable a user to manually set one or more of the network name and the device password, the device further comprising an initialization engine configured, upon initialization of the wireless router, to:
- determine if one or more of the network name and the device password has been manually set;
- if the network name has not been manually set, to cause the code manager to generate the first code and set the generated first code as the network name; and
- if the device password has not been manually set, to cause the code manager to generate the second code and set the generated second code as the password.

21. The device of claim 20, wherein the network manager is configured to cause the wireless network interface to broadcast the automatically or manually set network name for the wireless router.

22. The device of claim 18, wherein the information is one of a hardware address of the wireless router and data from a data capable cellular device in communication with the wireless router.

23. The wireless router of claim 18, wherein the unique data string and the predetermined alpha-numeric static data string each comprise an identifier for the manufacturer of the router.

24. A system for configuring a wireless router, comprising:
- means for electronically reading a physical hardware address of the wireless router;
- means for electronically reading a predetermined alpha-numeric static data string that is common to both the wireless router and at least one other wireless router of a same manufacturer, wherein the predetermined alpha-numeric static data string is determined before the wireless router is placed into service;
- means for automatically generating a code from the physical hardware address and the static data string;
- means for automatically setting the automatically generated code as a network name for the wireless router, wherein the network name differentiates a wireless network of the wireless router from a wireless network of another wireless router; and
- means for marking the wireless router that enables the marking of the wireless router with a physical representation of the code, wherein the means for electronically reading, electronically generating, and automatically setting are within the wireless router, and wherein the means for automatically generating the code is configured to generate the code by one of:
- combining at least a portion of the physical hardware address with the predetermined alpha-numeric static data string to generate the code; or
- applying an algorithm to the physical hardware address to generate a unique data string and combining the unique data string with the predetermined alpha-numeric static data string to generate the code.

25. The system of claim 24, wherein the unique data string and the predetermined alpha-numeric static data string each comprise an identifier for the manufacturer of the router.

* * * * *